United States Patent Office 3,392,263
Patented July 9, 1968

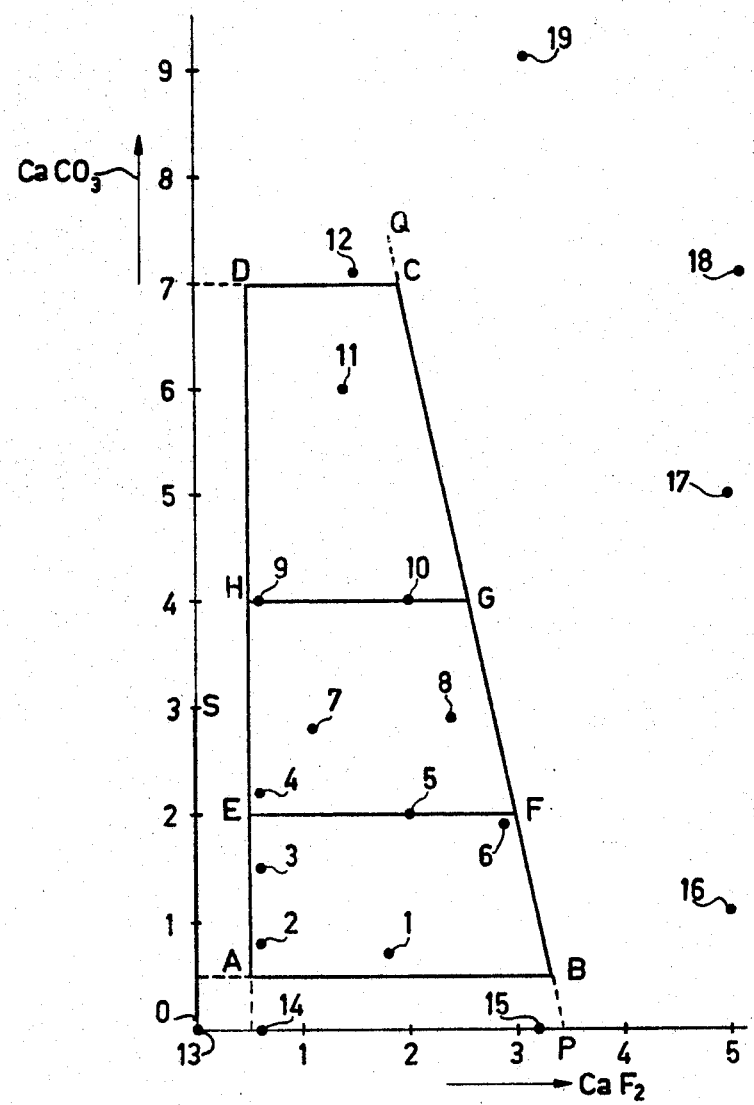

3,392,263
WELDING WIRE FOR ELECTRIC ARC WELDING OF STEEL IN A PROTECTIVE GAS ATMOSPHERE
Gerrit Willem Tichelaar, Wilhelmus Gerardus Essers, and Johannes Gerardus Verhagen, Emmasingel, Eindhoven, Netherlands, assignors to North American Philips Company, Inc., New York, N.Y., a corporation of Delaware
Filed Apr. 22, 1965, Ser. No. 450,084
Claims priority, application Netherlands, May 23, 1964, 6405794
6 Claims. (Cl. 219—146)

ABSTRACT OF THE DISCLOSURE

A welding wire for electric arc welding of steel in a protective gas atmosphere. The welding wire consists of a steel casing filled with a powdery mixture of calcium carbonate, calcium fluoride, deoxidizing metals and possible alloying metals or iron. The percentages of the calcium carbonate and calcium fluoride of the filling with respect to the entire weight of the wire fulfill the following conditions; calcium carbonate lies between 0.5 and 7, calcium fluoride is greater than 0.5 and $(CaCO_3)+4.7 (CaF_2)$ is less than 16.

---

The invention relates to welding wire for automatic or semiautomatic electric arc welding of steel in a protective gas atmosphere consisting of carbon dioxide or an inert gas, particularly argon, which may be mixed with oxygen, or mixtures of said gases. Examples of known gas mixtures are 95% of $CO_2+5\%$ of $O_2$, 95% of $A+5\%$ of $O_2$, 80% of $A+15\%$ of $CO_2+5\%$ of $O_2$ and 89% of $A+6\%$ of $CO_2+5\%$ of $O_2$. As a matter of course, the protective gases must be free of hydrogen and nitrogen and compounds thereof to the optimum, since these gases, as is known, have an adverse effect on the quality of the weld.

Reactions in the metallic melt in which carbon monoxide is formed, which results in porosity of the weld, may be counteracted, as is known, by using electrode wire having a content of deoxidizing metal, particularly silicon and furthermore, for example, titanium, aluminum and the like.

If in welding of steel in protective gases use is made of known steel welding wire having a silicon content of about 0.5 to 2% and a manganese content of about 1 to 3%, satisfactory values for the mechanical properties of the weld are obtained. However, at low temperatures the notch impact strength leaves much to be desired. In order to obtain a weld of a composition matching satisfactorily that of the metal of the work piece or in order to obtain a weld of given properties the welding wire may be provided with a content of further alloy constituents such as silicon, manganese, chromium, nickel, molybdenum and the like. With respect to the choice of the quantities of the alloy constituents a partial combustion during the welding operation should be taken into account.

In welding of steel in air it is already known to use a tubular welding wire filled uniformly throughout its length with a powdery mixture of slag-forming, deoxidizing and arc-stabilizing substances and, as the case may be, metal powders. The deoxidizing metals and the alloying metals may, as an alternative, be contained as alloy constituents wholly or partially in the metal of the casing.

It is known to obtain wire of this type by rolling and/or drawing of an ingot provided with a bore filled with a powdery mixture or by folding or wrapping a powdery mixture in metal tape and subsequently working up to the desired wire diameter.

The use of this kind of wire ensures that the molten metal is protected during the welding operation from the action of air, particularly of nitrogen by slag, while the properties and the profile of the weld obtained are favourable. However, in general, this method did not provide acceptable values of the notch impact strength at low temperatures. A further disadvantage of this method is the large quantity of slag which requires a considerable additional quantity of energy during the welding operation and which must finally be removed, in contrast to welding in a protective gas atmosphere whilst using homogeneous steel wire.

There is furthermore known the use of welding wire filled with slag-forming mixtures for welding in a protective gas, which combination provided the advantages of the two welding methods.

So far fillings of wires are described which contain flux mixtures of the rutile type or of the basic type and which are, of course, free of hydrogen and which are preferably not hygroscopic, said mixtures are of a type customary for coatings of welding rods. As far as basic mixtures are employed, the wire filling is composed of a slag-forming mixture containing 20 to 60% by weight of alkaline earth fluoride, particularly $CaF_2$, and furthermore deoxidizing material, if required, together with iron powder and alloy constituents. A further slag-forming substance is $CaCO_3$ in this case.

The thickness of the metal casing of these known welding wires is less than one quarter of the over-all wire diameter.

If the deoxidizing and alloying substances are left out of consideration and if the density of the wire filling is assumed to be only 80% (which means 20% of cavities in the filling), it is possible to calculate in a simple manner from the above-mentioned data for these known welding wires the minimum possible contents of $CaF_2$ and $CaCO_3$ in percents of the total wire weight.

These limit compositions lie on the straight line between the points $3.42 CaF_2$-$0 CaCO_3$ and $$1.83 CaF_2 - 7.34 CaCO_3,$$

the points P and Q respectively of the diagram shown in the accompanying drawing the sole figure of which is a graph illustrating the percentage by weight of $CaCO_3$ and $CaF_2$ in the welding wire. In the graph the ordinate shows the weight percentage of $CaCO_3$ and the abscissa shows the weight percentage of $CaF_2$ both based on the total weight of the welding wire. These compositions fulfill the condition: $4.7[CaF_2]+[CaCO_3]=16$.

With these known welding wires spattering likely to occur in welding in a protective gas atmosphere when use is made of welding wire of homogeneous metal is said to be counteracted, so that higher welding currents might be applied. However, the disadvantages involved in the presence of a comparatively large quantity of slag-forming substances subsist.

There is finally known a composite electrode for automatic arc welding of steel in a protective gas consisting of carbon dioxide or carbon-dioxide-containing mixtures, the filling containing apart from reducing metals and arc-stabilisers, 30 to 80% of alkaline earth oxide. The surface of the filling in the cross section is only 0.2 to 5% of the over-all section. If in this case the alkaline earth oxide is CaO, which is employed in the form of $CaCO_3$, for said wires which do not contain a fluoride, a $CaCO_3$ content of a few parts per thousand up to about 3% of the over-all wire weight can be calculated. These compositions lie on the line OS in the accompanying diagram.

This wire, which has a very low content of slag-forming substances, is intended to improve the welding properties and to provide the possibility of A.C. welding.

From research work leading to the invention it has been found that welding wires having a filling, the slag-forming portion of which is basic and consisting particularly of $CaCO_3$ and $CaF_2$ the ratios of which to the over-all wire weight lie between the limits thus set out, are quite useful for welding in protective gas atmospheres.

In this manner welds can then be obtained, which have very advantageous values for the notch impact strength at low temperatures and satisfactory weld properties. Moreover, the percentage of slag-forming mineral substances is then always comparatively low, so that the drawbacks involved in the presence of a great quantity of slag are at the same time reduced to an acceptable minimum.

The invention, which is based on these findings, relates to a steel welding wire for electric arc welding of steel in a protective gas atmosphere, particularly carbon dioxide and carbon-dioxide-containing gas mixtures, said wire consisting of a steel casing filled with a powdery mass having a low hydrogen content and containing calcium carbonate and calcium fluoride, arc-stabilising substances, deoxidizing metal, and, if desired, alloying metal and/or iron and is characterized in that the percentages of calcium carbonate and calcium fluoride of the filling related to the over-all wire weight fulfill at the same time the conditions: $[CaCO_3]$ lies between 0.5 and 7, $[CaF_2]$ is more than 0.5, $[CaCO_3]+4.7[CaF_2]$ is less than 16.

The range of compositions according to the invention is indicated in the diagram of the drawing for the contents of $CaCO_3$ and $CaF_2$ by the quadrangle ABCD.

Since the combustion loss of the deoxidizing metals and of certain alloying metals is reduced by the presence of $CaF_2$, higher percentages of said metals are, in general, chosen, with a low content of $CaF_2$ or conversely. The quantities of said metals are furthermore chosen, taking the combustion loss into account, with respect to the normal adaptation of the metal of the weld to the composition of the work piece and/or with respect to the desired properties of the weld. The required deoxidizing and alloying substances may, of course, form a constituent of the metal casing or of the filling or of both.

Very satisfactory results in regard to the efficiency of the welding operation and the profile and particularly the notch impact strength at low temperatures are obtained with a wire, the calcium carbonate content of which lies between 2 and 4% of the over-all wire weight. This range of compositions is indicated in the diagram of the drawing by the quadrangle EFGH.

The favourable results of the welding wire according to the invention are readily obtained in welding a single run. This is important in so-called enclosed welding and in vertical upward welding, in which case usually coarse crystal structures are obtained, which are known to have low impact values. For the same reason fewer layers or thicker layers may be made in horizontal welding in the downhand position with an electrode according to the invention.

The advantage of the improved impact strength with the single run also becomes manifest in multi-layer welding, since in this case the final layer exhibits the structure of said single run.

The improvement in ductility of the weld metal is apparent not only from the improvement in impact strength and a reduction of the temperature of transition to the brittle cracking of such a weld, but also from the reduction of the stop temperature of the weld metal in a measurement according to Robertson. In these measurements as is known, the temperature is measured on comparatively large test pieces at which a brittle cracking initiated in the material is not prolonged.

A conspicuous effect is that, when using argon without any addition of oxygen and/or carbon dioxide as a protective gas, welds of satisfactory quality can be obtained on steel by means of wire according to the invention in contrast to the result obtained by means of a homogeneous steel wire. This phenomenon is probably due to the presence of the carbon dioxide developed in the welding arc from the $CaCO_3$ contained in the welding wire according to the invention.

The $CaCO_3$ in the welding wire may be replaced wholly or partly by one of the further alkaline earth carbonates or an alkali carbonate or by corresponding compounds which are converted, like the carbonates, in the welding arc into oxides, for example oxalates.

The $CaF_2$ may also be replaced by other substances reducing the viscosity of the slag. Suitable materials are not only fluorides of alkaline earth metals and alkali metals but also complex fluorides, for example cryolite and furthermore substances such as $Al_2O_3$, $SiO_2$ and $TiO_2$, which are capable of forming low-melting point slag with the alkaline earth oxide produced in the welding arc.

The invention will now be described with reference to several examples.

The indicated values of impact strength at different temperatures are measured on test rods of 10 x 10 x 55 mms., having a V-shaped notch, the opening angle of which is 45°, the depth in 2 mms. and the radius of the bottom of which is 0.25 mm. (Charpy V-notch). The rods are taken at right angles to the welding direction from the plate plus the weld and the V-notch is made in the centre of the weld at right angles to the surface of the weld. Apart from a few exceptions the values indicated in the following tables are averages of three of four measurements.

Table 1 indicates the results of so-called enclosed welding with carbon dioxide as a protective gas on 25 mm.-steel sheet of a composition of 0.6Mn-0.04Si-0.13C, remainder iron (St. 37); the gap width was 13 mms., the welding current about 400 a.

It is known that in enclosed welding the gap between two vertical steel sheets is welded fully in one welding operation. The liquid welding metal is held by copper blocks.

In the first column of the table there are indicated the numbers of a plurality of tests, in the second column the gross composition in percent of the over-all wire weight and in the third column the values of the impact strength (Charpy V-notch) at different temperatures.

The table first gives the results obtained by wires of compositions according to the invention (Nos. 1 to 12), all lying within the quadrangle ABCD of the diagram. It appears therefrom that the improvement in impact strength is at a maximum with a $CaCO_3$ content of 2% and more (Nos. 4 to 12). In connection with the low content of slag-forming substances the compositions with a $CaCO_3$ content of 2 to 4% lying within the quadrangle EFGH of the diagram are preferred (Nos. 4 to 10).

A group of compositions (Nos. 13 to 19) is furthermore indicated, which are all lying beyond the range ABCD. From a comparison with the compositions according to the invention (Nos. 1 to 12) it appears that wire without $CaCO_3$ and $CaF_2$ (No. 13), wire with only $CaF_2$ (Nos. 14, 15) and wire with a content of $CaF_2$ and $CaCO_3$ not fulfilling the conditions according to the invention (Nos. 16 to 19) yield less favourable results. An excess quantity of $CaF_2$ and of $CaCO_3$ reduces the effect.

TABLE 1

| Number | Wire composition in percent by weight, remainder iron | | | | Notch impact strength in kgm./cm.² | | | |
|---|---|---|---|---|---|---|---|---|
| | Mn | Si | CaCO₃ | CaF₂ | −50° C. | −30° C. | −10° C. | +20° C. |
| 1 | 1.6 | 0.8 | 0.7 | 1.8 | 1.1 | 4.4 | 6.1 | 9.2 |
| 2 | 1.6 | 0.8 | 0.8 | 0.6 | | 0.9 | 4.8 | 8.9 |
| 3 | 1.6 | 0.8 | 1.5 | 0.6 | | 1.4 | 9.3 | 13.2 |
| 4 | 1.6 | 0.8 | 2.2 | 0.6 | 2.9 | 6.7 | 9.0 | 14.2 |
| 5 | 1.7 | 0.8 | 2.0 | 2.0 | 3.7 | 6.2 | 11.1 | |
| 6 | 1.6 | 0.8 | 1.9 | 2.9 | 4.4 | 10.1 | 12.7 | |
| 7 | 1.6 | 0.7 | 2.8 | 1.1 | 3.4 | 9.1 | 10.2 | 14.0 |
| 8 | 1.6 | 0.8 | 2.9 | 2.4 | 3.1 | 9.3 | 11.0 | 13.1 |
| 9 | 1.6 | 0.8 | 4.0 | 0.6 | 1.1 | 4.9 | 5.0 | 9.9 |
| 10 | 1.7 | 0.8 | 4.0 | 2.0 | | | 13.2 | |
| 11 | 1.6 | 0.9 | 6.0 | 1.4 | 1.4 | 6.7 | 8.2 | 12.9 |
| 12 | 1.6 | 0.8 | 7.1 | 1.5 | 3.4 | 7.1 | 11.1 | |
| 13 | 1.6 | 0.8 | | | | 1.2 | 1.9 | 4.2 |
| 14 | 1.6 | 0.8 | | 0.6 | | | 1.7 | 4.7 |
| 15 | 1.8 | 0.9 | | 3.2 | | 1.7 | 2.9 | 8.4 |
| 16 | 1.7 | 0.9 | 1.1 | 5.0 | 0.8 | 1.8 | 4.7 | |
| 17 | 1.6 | 0.8 | 5.0 | 5.0 | 2.0 | 3.1 | 5.7 | |
| 18 | 1.6 | 0.8 | 7.1 | 5.1 | 1.8 | 2.5 | 4.8 | |
| 19 | 1.7 | 0.8 | 9.2 | 3.1 | 1.1 | 3.6 | 3.7 | 9.6 |

Table 2 indicates the results of enclosed welding in a CO₂ atmosphere on different kinds of steel with wires according to the invention (Nos. 21, 22, 23 and 25).

By way of comparison some results are given for wires not containing CaCO₃ and CaF₂ (Nos. 20 and 24).

Table 4 gives the results of enclosed welding in a carbon dioxide atmosphere on 25 mm. steel sheet St. 37 by means of welding electrodes according to the invention, in which the CaCO₃ or the CaF₂ is partly replaced by

TABLE 2

| Number | Kind of steel | Wire composition in percent by weight, remainder iron | | | | Notch impact strength in kgm./cm.² | | | |
|---|---|---|---|---|---|---|---|---|---|
| | | Mn | Si | CaCO₃ | CaF₂ | −50° C. | −30° C. | −10° C. | +20° C. |
| 20 | St. 52, 25 mm | 1.6 | 0.8 | | | | 1.0 | 2.2 | |
| 21 | St. 52, 19 mm. (1.35 Mn-0.49 Si-0.23 C, rem. iron). | 1.4 | 0.7 | 2.4 | 0.7 | | 3.2 | 4.5 | 8.7 |
| 22 | St. 41, 12 mm. (1.2 Mn-0.07 Si-0.12 C, rem. iron). | 1.6 | 0.8 | 2.2 | 0.6 | | 2.6 | 4.2 | 9.7 |
| 23 | Ni steel, 13 mm. (1.08 Mn-0.26 Si-0.08 C-0.5 Ni, rem. Fe). | 1.6 | 0.8 | 2.1 | 0.6 | 1.2 | 5.8 | 6.7 | 11.9 |
| 24 | Cr-Ni-Mo steel, 45 mm. | 1.6 | 0.8 | | | 0.8 | 1.2 | 1.5 | 2.4 |
| 25 | (0.06 Mn-0.20 Si-0.16 C-0.6 Ni-0.4 Mo-0.16 Cr). | 1.7 | 0.8 | 2.6 | 1.1 | 2.5 | 4.8 | 7.4 | |

Examples of alloyed welding wire in enclosed welding in CO₂ on a few kinds of steel are given in Table 3 (Nos. 26, 27). By way of comparison a result obtained with wire without CaCO₃ and CaF₂ (No. 28) is given.

other carbonates, fluorides or oxides having a reducing effect on the melting point of the slag.

TABLE 4

| Number | Wire composition in percent by weight, remainder iron | | | Notch impact strength in kgm./cm.² | | | |
|---|---|---|---|---|---|---|---|
| | Mn | Si | Mineral constituents | −50° C. | −30° C. | −10° C. | −20° C. |
| 29 | 1.5 | 0.8 | 3.9 BaCO₃-0.6 CaF₂ | 1.7 | 3.3 | 5.6 | 12.1 |
| 30 | 1.5 | 0.7 | 2.7 SrCO₃-0.6 CaF₂ | 3.8 | 8.0 | 7.8 | |
| 31 | 1.5 | 0.7 | 2.8 CaCO₃-1.8 SrF₂ | 1.5 | 3.2 | 6.9 | 14.8 |
| 32 | 1.6 | 0.8 | 2.9 CaCO₃-1.9 NaAlF₆ | | 3.7 | 6.4 | 13.6 |
| 33 | 1.6 | 0.8 | 3.0 CaCO₃-1.5 Al₂O₃ | | 3.1 | 7.4 | 11.7 |
| 34 | 1.6 | 0.8 | 2.7 CaCO₃-1.8 Na₂CO₃ | 1.2 | 3.4 | 4.0 | 7.7 |
| 35 | 1.6 | 0.8 | 2.0 CaMg(CO₃)₂-0.9 CaF₂ | | 1.7 | 4.6 | 11.7 |
| 36 | 1.8 | 0.9 | 2.5 CaCO₃-0.7 CaF₂-0.5 SiO₂ | 5.5 | | | 11.6 |

Table 5 provides the results obtained in welds made in downhand position in several layers, CO₂ being used

TABLE 3

| Number | Kind of steel | Wire composition in percent by weight, remainder iron | | | | | Notch impact strength in kgm./cm.² | | | |
|---|---|---|---|---|---|---|---|---|---|---|
| | | Mn | Si | CaCO₃ | CaF₂ | Other elements | −50° C. | −30° C. | −10° C. | +20° C. |
| 26 | St. 37, 25 mm | 1.5 | 0.7 | 2.0 | 0.6 | 1.9 Ni | 3.2 | 4.6 | 9.5 | |
| 27 | Cr-Ni-Mo-steel, 28 mm., 1.06 Mn-0.20 Si-0.16 C-0.6 Ni. | 1.2 | 0.7 | 2.3 | 0.6 | 0.5 Ni, 0.4 Mo, 0.2 Cr | 4.5 | 5.9 | 8.4 | |
| 28 | 0.4 Mo-0.16 Cr, rem. iron | 1.2 | 0.7 | | | 0.5 Ni, 0.4 Mo, 0.2 Cr | 1.9 | 2.9 | 3.0 | 5.6 | as the protective gas. Said welds form V-seams with an angular aperture of 70°, a front aperture of 10 mms. in 16 mm. steel sheet St. 37. The seam was filled in nine runs in five layers (1–1–2–2–3) with intervals of 20 minutes between the layers.

The welds Nos. 37 and 38 are made from wire according to the invention. By way of comparison the result is given for a wire without $CaCO_3$ and $CaF_2$ (No. 39).

TABLE 5

| Number | Wire composition in percent by weight, remainder iron | | | | Notch impact strength in kgm./cm.² | | | |
|---|---|---|---|---|---|---|---|---|
| | Mn | Si | CaCO₃ | CaF₂ | −50° C. | −30° C. | −10° C. | +20° C. |
| 37 | 1.7 | 0.8 | 2.6 | 1.1 | 5.3 | 8.1 | 12.2 | |
| 38 | 1.6 | 0.8 | 2.1 | 0.6  2.1 Ni | 6.9 | 9.2 | 13.1 | 13.4 |
| 39 | 1.6 | 0.8 | | | | 4.2 | 8.1 | 11.3 |

A few simpler welds of the layer-type are indicated in Table 6. V-seams were made with an angular aperture of 70° in 12 mm. steel sheet St. 41 of a kind suitable for use at −60° C. The composition of the sheet was 1.2Mn-0.07Si-0.12C-remainder Fe. The welds were made in two layers in downhand position with a current of 180 a. (Nos. 40 to 42) and in three layers in vertical upward welding with 110 a. (No. 43). It appears from the tests Nos. 40, 41, and 42 that with the use of not more than 0.3% of $CaF_2$ and 1.4% of $CaCO_3$ already some improvement in the impact strength was obtained and that the improvement is material when the manganese content is raised and that the optimum results are obtained from wire containing 2.0% of $CaCO_3$ and 0.6% of $CaF_2$.

TABLE 6

| Number | Wire composition in percent by weight, remainder iron | | | | Notch impact strength in kgm./cm.² | | | | |
|---|---|---|---|---|---|---|---|---|---|
| | Mn | Si | CaCO₃ | CaF₂ | −60° C. | −50° C. | −30° C. | −10° C. | +20° C. |
| 40 | 1.6 | 0.8 | 1.4 | 0.3 | | 1.4 | 5.6 | 11.2 | |
| 41 | 2.0 | 0.8 | 1.4 | 0.3 | 2.8 | 4.1 | 7.8 | 11.6 | |
| 42 | 1.6 | 0.8 | 2.0 | 0.6 | 6.4 | 7.4 | 10.6 | | |
| 43 | 1.6 | 0.8 | 2.0 | 0.6 | 6.3 | 8.9 | 12.5 | 14.1 | |

Table 7 shows the results of welds obtained in other protective gases than $CO_2$. The welds are made in 12 mm. sheet St. 41 (1.2Mn-0.7Si-0.12C, remainder Fe), V-seam with an angular aperture of 70°, in two layers with 180 a.

TABLE 7

| Number | Wire composition in percent by weight, remainder iron | | | | Protective gas | Notch impact strength in kgm./cm.² | | | |
|---|---|---|---|---|---|---|---|---|---|
| | Mn | Si | CaCO₃ | CaF₂ | | −60° C. | −50° C. | −30° C. | −10° C. |
| 44 | 1.55 | 0.77 | 2.0 | 0.6 | Argon, CO₂+5% O₂, 80% A+15% CO₂+5% O₂. | 3.4 | 4.8 | 6.7 | 9.3 |
| 45 | 1.7 | 0.86 | 2.7 | 1.1 | | 4.1 | 6.2 | 11.0 | 12.5 |
| 46 | 1.7 | 0.86 | 2.7 | 1.1 | | 3.2 | 5.6 | 7.2 | 13.3 |

Finally the results of a tensile test. A rod (diameter $D=8$ mms., length $L=5D$) is taken from the centre in the longitudinal direction of a weld obtained by the method illustrated in Table 5 on 16 mm. steel sheet St. 37 by a welding wire of the composition No. 37:

Tensile strength _____ kg./mm.² __ 48.8
Yield point _____ kg./mm.² __ 38.7
Elongation _____ percent __ 31.2
Contraction _____ do ____ 70

What is claimed is:
1. A steel welding wire particularly adapted for the electrical arc welding of steel in a protective gas atmosphere containing carbon dioxide, said wire consisting of a steel casing filled with a powdery mass substantially free of hydrogen producing components and containing calcium fluoride and calcium carbonate and deoxidizing metals and wherein the percentages of the calcium carbonate and calcium fluoride of the filling with respect to the entire weight of the wire fulfill the following conditions:

($CaCO_3$) lies between 0.5 and 7,
($CaF_2$) is greater than 0.5
and ($CaCO_3$+4.7 ($CaF_2$)) is less than 16.

2. The welding wire of claim 1 wherein the powdery mass contains iron and alloying metals.
3. The welding wire of claim 1 wherein the percentage of calcium carbonate lies between 2 and 4.
4. The welding wire of claim 1 wherein at least part of the calcium carbonate is replaced by a carbonate selected from the group consisting of barium carbonate, strontium carbonate, magnesium carbonate and the alkali metal carbonates.
5. The welding wire of claim 1 wherein at least part of the calcium carbonate is replaced by an oxalate.
6. The welding wire of claim 1 wherein at least part of the calcium fluoride is replaced by a compound selected from the group consisting of strontium fluoride, sodium aluminum fluoride, aluminum oxide, silicon dioxide and titanium dioxide.

References Cited

UNITED STATES PATENTS 1,882,601   10/1932   Hollup _____ 219—146
2,855,333   10/1958   Wasserman et al. __ 219—146 X

FOREIGN PATENTS 858,854   1/1961   Great Britain.

RICHARD M. WOOD, *Primary Examiner.*

B. A. STEIN, *Assistant Examiner.*